H. C. SCHAPER.
WEIGHING SCALE.
APPLICATION FILED AUG. 7, 1916.

1,278,029.

Patented Sept. 3, 1918.
3 SHEETS—SHEET 1.

INVENTOR
HENRY C. SCHAPER
BY
ATTY.

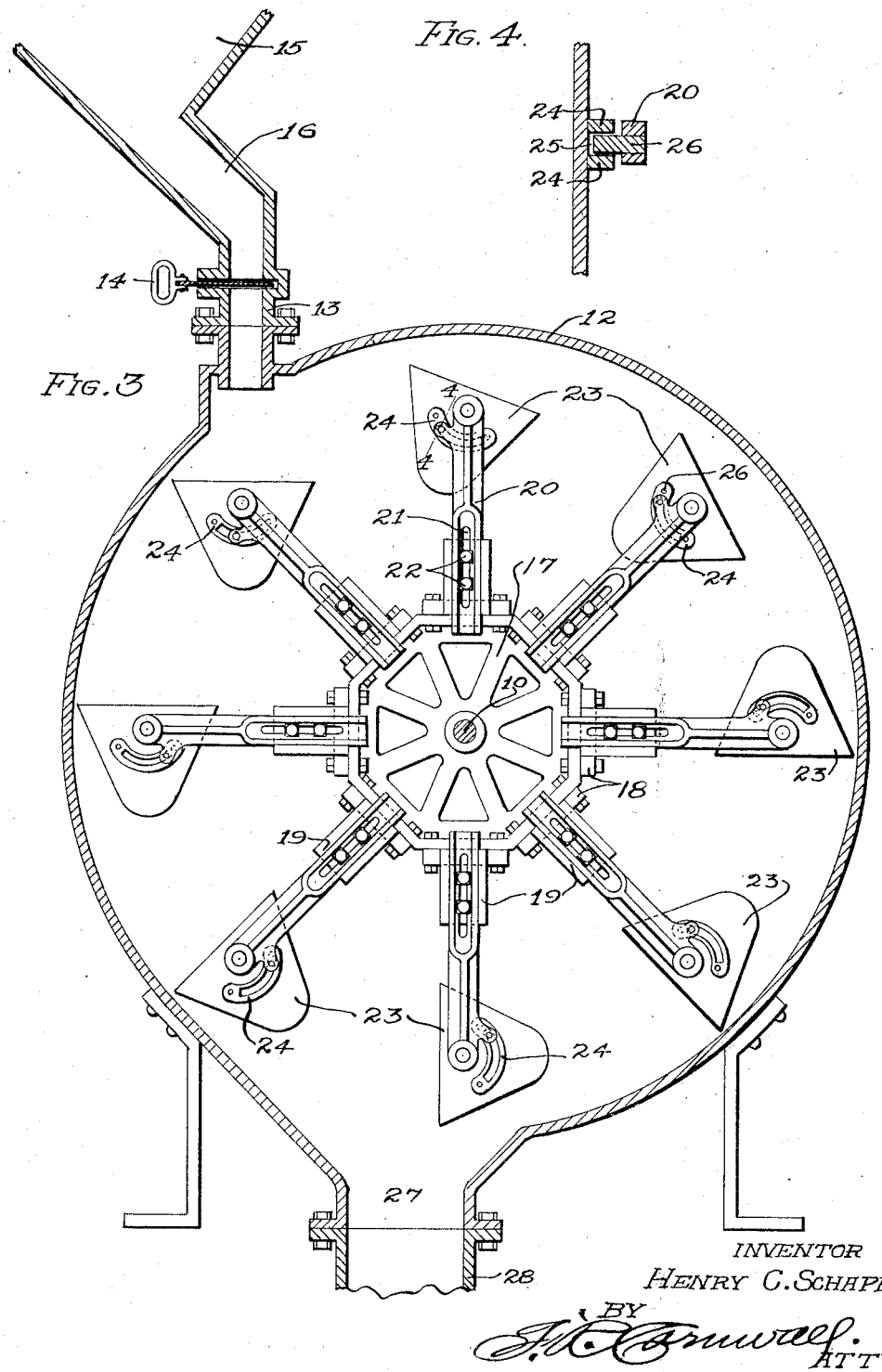

H. C. SCHAPER.
WEIGHING SCALE.
APPLICATION FILED AUG. 7, 1916.
1,278,029.
Patented Sept. 3, 1918.
3 SHEETS—SHEET 3.
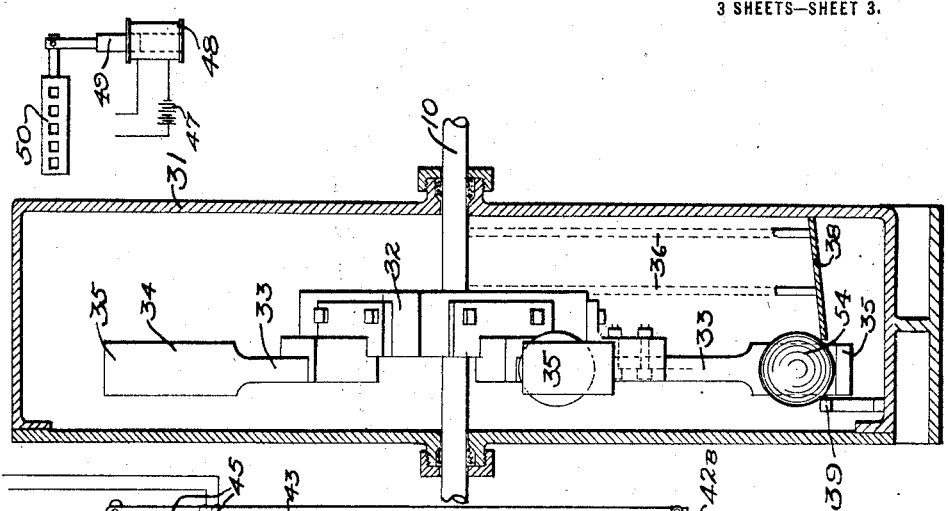
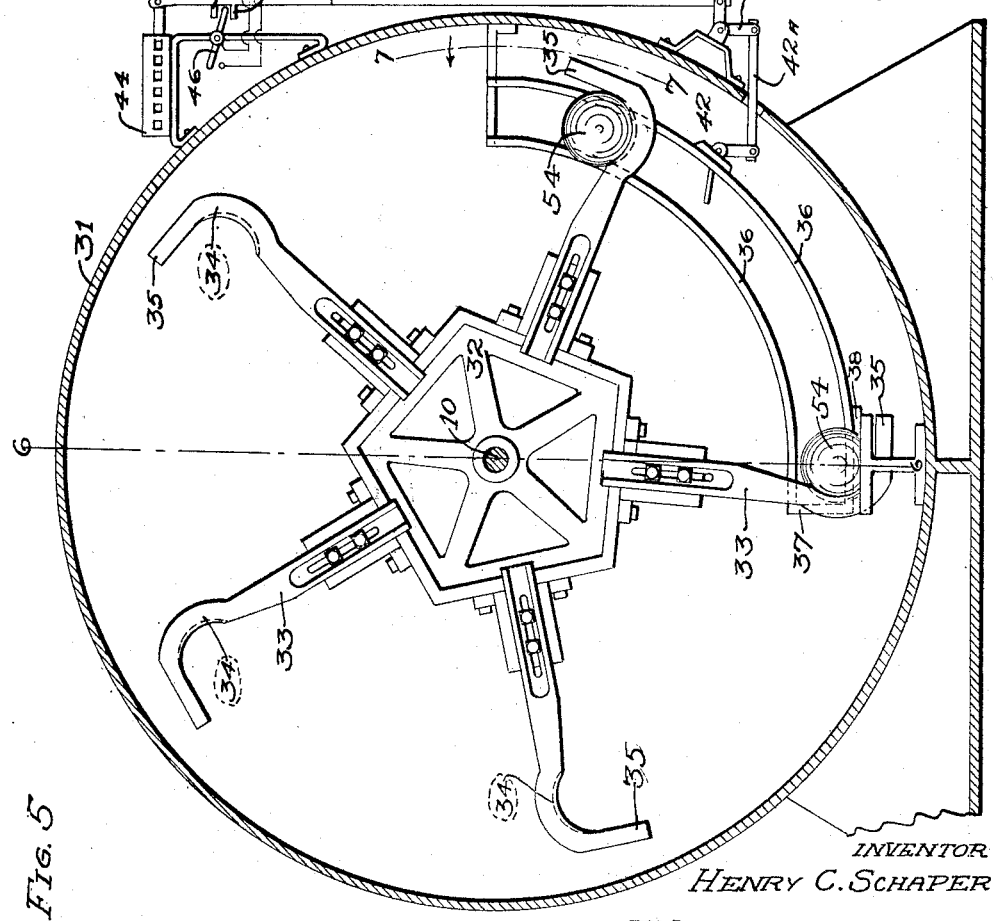
INVENTOR
HENRY C. SCHAPER
BY
ATTY.

UNITED STATES PATENT OFFICE.

HENRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

WEIGHING-SCALE.

1,278,029.  Specification of Letters Patent.  Patented Sept. 3, 1918.

Application filed August 7, 1916. Serial No. 113,545.

*To all whom it may concern:*

Be it known that I, HENRY C. SCHAPER, a citizen of the United States, residing at St. Louis, Missouri, have invented a certain new and useful Improvement in Weighing-Scales, of which the following is a full, clear, and exact description, such as will enable others skilled in the art to which it appertains to make and use the same, reference being had to the accompanying drawings, forming part of this specification.

My invention relates to an automatic weighing scale of the continuous rotary type, said scale being particularly designed for weighing grain or granular substances.

The principal objects of my invention are, to provide a comparatively simple, accurate and positively operating scale mechanism which, by reason of its continuous rotary action, has a comparatively high capacity; to provide a scale having a series of revolving hoppers or buckets which receive the material being weighed, and to provide a series of movable weights which serve to counter-balance the weight of the material delivered into the hoppers or buckets, and to provide a scale of the continuous rotary type with a stabilizer which, in effect, causes the scale to operate evenly and without vibration.

With the foregoing and other objects in view, my invention consists in certain novel features of construction and arrangement of parts, hereinafter more fully described, claimed and illustrated in the accompanying drawings, in which—

Fig. 3 is a vertical section taken on the line 3—3 of Fig. 1.

Fig. 4 is an enlarged detail section taken approximately on the line 4—4 of Fig. 3.

Fig. 5 is a vertical section taken approximately on the line 5—5 of Fig. 1.

Fig. 6 is a vertical section taken approximately on the line 6—6 of Fig. 5.

Figures 1, 2, 7:
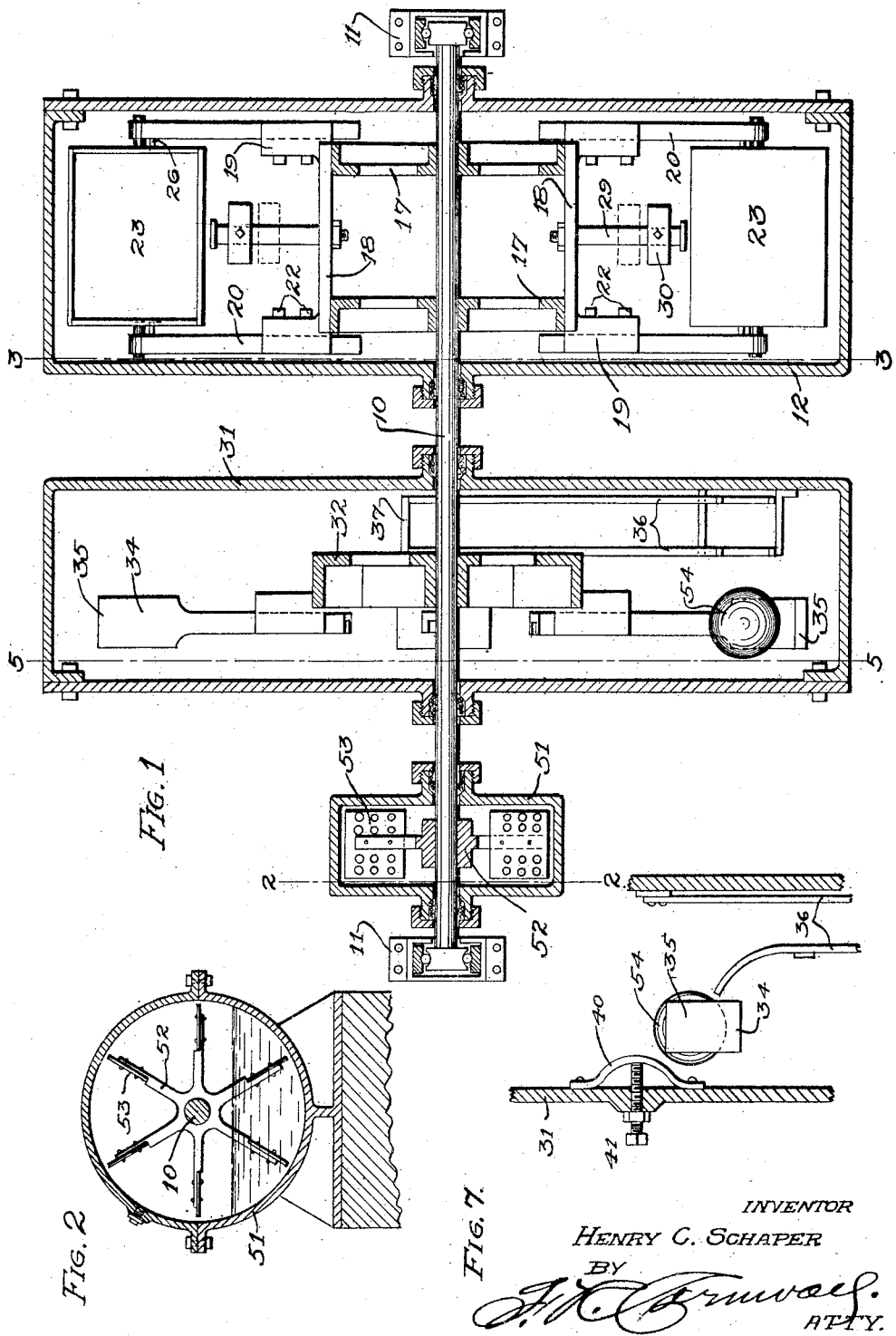
Figure 1 is a horizontal section taken through the center of a scale of my improved construction.
Fig. 2 is a vertical section taken on the line 2—2 of Fig. 1.
Fig. 7 is a detail elevational view taken approximately on the line 7—7 of Fig. 5, and illustrating the means utilized for unseating the movable weights from the weight carrying arms.

Referring by numerals to the accompanying drawings, 10 designates a shaft, the ends of which are journaled in suitable ball bearings 11, the latter being carried by suitable uprights or standards and located on a suitable base near one end of said shaft is a housing 12, preferably of sheet metal which incloses the material receiving receptacles and the supports therefor.

Leading into the upper portion of the housing 12 and preferably at a point slightly to one side of the center thereof is a spout 13, the same being provided with a suitable gate or cut-off valve 14. Leading to the upper portion of said spout from a bin or hopper 15 is a chute 16.

Fixed on shaft 10 within the housing 12 is a pair of spiders 17, the same being spaced a suitable distance apart and connecting the outer portions of these spiders are transversely disposed plates 18.

Formed integral with or fixed to the ends of each plate 18 is a pair of outwardly projecting brackets 19, the outer faces of which are grooved in order to receive radially arranged arms 20. The inner portions of these arms are slotted as designated by 21 and passing through each slot is a pair of bolts 22, the same being seated in the brackets 19, and thus means is provided for the radial adjustment of the arms 20.

A suitable receptacle or bucket 23, preferably of sheet metal, is pivotally suspended or swung between each pair of arms 20, the side walls of said buckets being preferably inclined so that when the buckets are tilted at the bottom of the housing 12, the material contained therein will readily discharge by gravity.

Fixed in any suitable manner to one of the end walls of each receptacle 23 is an arcuate plate 24, the same being concentric with the axis of movement of the receptacle and each plate is slotted as designated by 25 so as to receive a pin 26, the latter projecting inwardly from a bracket or extension on one of the arms 20.

By virtue of the construction just described, the swinging movement of each receptacle with respect to the arms 20 which support the same is limited, and consequently all of the buckets are shifted into positions so that they will dump their loads at the bottom of the housing 12.

Formed in the bottom of the housing 12 is an outlet opening 27 and leading therefrom is a discharge spout 28.

Fixed to each transverse plate 18 is a radially disposed rod 29, and adjustably positioned upon each rod is a weight 30. By adjusting the positions of these weights 30 upon the rods 29, the center of gravity of the revolving structure within housing 12 can be maintained coincident with the axis of said structure, and which axis is necessarily the center of shaft 10.

Located adjacent to housing 12 is a housing 31 preferably of sheet metal and through which the shaft 10 passes. Fixed on said shaft within the housing is a spider 32 on which is mounted a series of radially adjustable arms 33, the same being provided in their outer ends with weight receiving pockets 34, the bottoms of which are slightly concave in cross section and projecting outwardly at right angles from the ends of said arms directly in front of the pockets 34 are fingers 35.

Located within the lower portion of the housing 31 and to the side of the spider 32 and weight carrying arms 33 is a runway for the counter-balancing weights utilized in my improved scale, said runway being preferably formed of four curved bars 36, the upper ends of which occupy substantially the same horizontal plane with the shaft 10 and the lower ends of which terminate below said shaft and at a point near the bottom of the housing.

One of the pair of bars 36 forming the runway project a slight distance beyond the other pair of bars at the lower end of said runway and fixed to the ends of the longer pair of bars is a vertically disposed plate 37 which forms an end for said runway.

Fixed to the lower one of the longer pair of bars immediately in front of this plate 37 is a transversely disposed plate 38, the same inclining slightly downward toward its outer end and arranged on the bottom of the housing 31 directly opposite the lower end of this plate 38 is a short rail 39, the same serving as a rest for counter-balancing weights after the same leave the lower end of the runway.

The outer ends of the weight carrying arms 33 traverse the space between the lower end of plate 38 and rail 39.

Positioned on the inner face of one of the side walls of housing 31 slightly above the upper ends of the rails 36 forming the weight runway is a resilient plate 40, the same being adjustable by means of a set screw 41 which passes through the side wall of the housing, said plate being for the purpose of engaging against the weights as they are brought to the top of the runway by the weight carrying arms and as said weights engage against said plate, they will be forced laterally off the pockets 34 into the upper end of the runway, and after passing downward therethrough each weight will pass downward over the inclined plate 38 and occupy a position on the edge thereof and upon rail 39, and in which position said weight is directly in the path of travel of one of the weight carrying arms.

Fulcrumed on one of the rails 36 is a small bell crank 42, one arm of which projects into the runway so as to occupy a position in the path of travel of the weights through said runway. One end of a push rod 42$^a$ is connected to the other end of this bell crank, said push rod extending through the housing 31 and its outer end being connected to one of the arms of a fulcrumed bell crank 42$^b$. Connected to the other end of this last mentioned bell crank is the lower end of a push rod 43, the same extending to the operating lever of a suitable counting device 44, the latter being preferably located on the exterior of housing 31.

In some instances, it may be found desirable to locate a counting device some distance away from the weighing machine, and where such construction is employed, said counting device can be operated electrically.

Push rod 42 is provided with a pair of arms or pins 45 which, when said rod is pushed upward, closes a switch 46, located in an electric circuit, said circuit including a battery 47 and a magnet 48, the latter when energized, attracting an armature 49, the same also serving as the actuating lever for the counting device 50.

Located a short distance from housing 31 is a housing 51, through the center of which the shaft 10 passes, and fixed on said shaft within said housing is a spider 52, the arms of which carry perforated plates 53.

The housing 51 is partially filled with a comparatively heavy liquid, such as oil, glycerin or the like, and thus the movement of the perforated plates in their travel through the housing, will be impeded and all vibration which might develop in the machine during operation will be absorbed.

The weights 54 utilized in connection with my improved machine are preferably in the form of spherical bodies of metal of definite weight, and of such size as to readily fit within the pockets 34 and to pass through the runway formed by the rails 36.

The operation of my improved weighing machine is as follows:

When gate 14 is opened, grain or the material being weighed passes from hopper 15 through chute 16 and from thence through spout 13 and discharges into the receptacle 23 which is immediately beneath said spout. The weight of the material thus delivered to the receptacle will cause the receptacle carrying frame comprising the spiders 17 and arms 20 to rotate, and consequently imparting rotary motion to shaft 10.

Before one receptacle into which the grain or granular material discharges passes out of the path of travel of the stream of incoming grain or material, the next adjacent receptacle will move into position to receive said incoming grain or material, and thus the rotary motion of the receptacles and their supports, together with the shaft 10, is continuous.

As shaft 10 is thus rotated, spider 32 and the weight engaging arms 33 will be rotated within housing 31 and during such movement, the outer end of each arm 33 will engage one of the weights 54, which latter is positioned on the lower edge of plate 38 and rail 39.

When a sufficient amount of grain or material being weighed has discharged into the receptacles passing beneath the spout 13 or an amount having sufficient weight to counter-balance and overcome the weight 54, which is engaged by one of the arms 33, the engaged weight will be raised from a point directly beneath the shaft 10 to a point substantially in horizontal alinement with said shaft or to a point directly opposite the upper end of runway composed of the rails 36.

As hereinbefore stated, the weight of each member 54 is definite and in order to move each weight from a point directly below shaft 10 to a point substantially in the same horizontal plane with said shaft, a corresponding amount of weight of grain or material being weighed must necessarily enter the receptacles and pass downward on the opposite side of the shaft, with the result that all of the grain or material passing through the apparatus is accurately weighed by operations which are practically continuous.

As each weight carrying arm 33 reaches a substantially horizontal position, the weight 54 carried by said arm will bear against member 40, with the result that said weight will be shifted laterally and pass from the end of the weight carrying arm into the runway composed of rails 36, and after passing to the lower end of said runway, the weight will travel a short distance laterally over inclined plate 38, said weight finally stopping against rail 39, where it is in position to be engaged by the next weight carrying arm.

During the travel of each weight through the runway, it will engage the inwardly projecting arm or bell crank 42, thereby actuating said bell crank with the result that push rod 43 is slightly elevated, thereby actuating the mechanism within counting device 44, with the result that an accurate record of the weighing operations is kept, such record relating solely to the weight of the material passing through the machine and not to the bulk or volume thereof.

In the event that it is desired to operate the counting device 50 which is located at a point remote from the weighing machine, a suitable switch in the electric circuit is closed, and with each actuation of rod 43, switch 46 which is normally opened, will be closed, with the result that magnet 48 will be energized, thereby attracting armature 49, and consequently actuating the mechanism within counting device 50.

During weighing operations, spider 52 and plates 53 will be revolved within housing 51 and by virtue of the fact that a number of said plates are submerged or partially submerged in the body of heavy liquid within said housing, the movements of the operating parts will be stabilized and freed of practically all vibration. As heretofore stated, the swinging movement of each receptacle 23 with respect to the pair of arms 20 on which it is suspended is limited by the pin 26 which engages in slot 25.

As each receptacle moves toward the bottom of housing 12, it will start to tilt by reason of the engagement of the pin 26 with one end of slot 25, and as the receptacle reaches a point directly beneath the shaft 10, it will be tilted to such a position as to permit its contents to discharge by gravity, and after discharging, said material will pass through outlet 27 and from thence to and through discharge pipe 28.

As the receptacles reach the highest point in their travel, they will by gravity swing to normal positions, and thus be disposed so as to receive the incoming grain or material as they move into position below the discharge end of spout 13.

A weighing machine of my improved construction is comparatively simple, is entirely automatic in operation, has a comparatively large weighing capacity owing to the fact that it is of the continuous rotary type, and said machine is absolutely accurate in all its operations by reason of the fact that all material passing through the machine must necessarily counter-balance and elevate weighing members of fixed and definite weight. By utilizing counter-balancing members of definite weight, the actual weight of the grain or material passing through the machine is obtained, and as said counter-balancing members in their passage through the machine automatically operate suitable counting mechanism, an accurate record of the weight of the material passing through the machine is maintained and can be readily ascertained at any time.

It will be readily understood that minor changes in the size, form and construction of the various parts of my improved weighing machine can be made and substituted for those herein shown and described, without departing from the spirit of my invention, the scope of which is set forth in the appended claims.

I claim:

1. In a weighing machine, a rotatably mounted support, a series of receptacles pivotally suspended from said support, which receptacles are adapted to receive the material to be weighed, and a series of weights adapted to travel with said support for a part of one of its revolutions and to counter-balance the weight of the material delivered to said receptacles.

2. In a weighing machine, a rotatably mounted support, a series of receptacles pivotally suspended from said support, which receptacles are adapted to receive the material to be weighed, a series of weights adapted to travel with said support for a part of one of its revolutions and to counter-balance the weight of the material delivered to said receptacles, and means for recording the movement of said weights.

3. In a weighing machine, a rotatably mounted support, a series of receptacles pivotally suspended from said support, which receptacles are adapted to receive the material to be weighed, a series of weights adapted to travel with said support for a part of one of its revolutions and to counter-balance the weight of the material delivered to said receptacles, and means for absorbing vibration of the operating parts of the machine.

4. In a machine of the class described, a shaft, a series of arms carried thereby, receptacles pivotally suspended from said arms, which receptacles are adapted to receive the material to be weighed, weights adapted to counter-balance the weight of the material delivered to the receptacles, and means carried by the shaft for successively engaging said weights and lifting the same as said shaft is rotated by the weight of the material delivered to the receptacles.

5. In a machine of the class described, a shaft, a series of arms carried thereby, receptacles pivotally suspended from said arms, which receptacles are adapted to receive the material to be weighed, weights adapted to counter-balance the weight of the material delivered to the receptacles, means carried by the shaft for successively engaging said weights and lifting the same as said shaft is rotated by the weight of the material delivered to the receptacles, and means for recording the movements of said weights.

6. In a machine of the class described, a shaft, a series of arms carried thereby, receptacles pivotally suspended from said arms, which receptacles are adapted to receive the material to be weighed, weights adapted to counter-balance the weight of the material delivered to the receptacles, means carried by the shaft for engaging said weights and lifting the same as said shaft is rotated by the weight of the material delivered to the receptacles, which weights automatically discharge from the lifting means after having been carried a predetermined distance, and means directly connected to the shaft for absorbing the vibration of the operating parts of the machine.

7. In a machine of the class described, a shaft, a series of arms carried thereby, receptacles pivotally suspended from said arms, which receptacles are adapted to receive the material to be weighed, weights adapted to counter-balance the weight of the material delivered to the receptacles, means carried by the shaft for engaging said weights and lifting the same as said shaft is rotated by the weight of the material delivered to the receptacles, which weights automatically discharge from the lifting means after having been carried a predetermined distance, means for recording the movements of said weights, and means directly connected to the shaft for absorbing the vibration of the operating parts of the machine.

8. In a machine of the class described, a shaft, a series of arms carried thereby, receptacles pivotally connected to said arms, which receptacles are adapted to receive the material to be weighed, means whereby the receptacles are tilted to dump their contents when said receptacles reach their lowermost point of travel, means including movable weights for counter-balancing the weight of the material delivered to and carried by the receptacles and means for successively picking up the weights and carrying them for a part of a complete revolution of the shaft.

9. In a machine of the class described, a shaft, a series of arms carried thereby, receptacles pivotally connected to said arms, which receptacles are adapted to receive the material to be weighed, means whereby the receptacles are tilted to dump their contents when said receptacles reach their lowermost point of travel, means including movable weights for counter-balancing the weight of the material delivered to and carried by the receptacles, means for successively picking up one of the weights and carrying them for a part of a complete revolution of the shaft, and means for registering the actions of the counter-balancing weights.

10. In a machine of the class described, a shaft, a series of arms carried thereby, receptacles pivotally connected to said arms, which receptacles are adapted to receive the material to be weighed, means whereby the receptacles are tilted to dump their contents when said receptacles reach their lowermost point of travel, means including movable weights for counter-balancing the weight of the material delivered to and carried by the receptacles, means for successively picking up one of the weights and carrying them for a part of a complete revolution of the shaft, and means directly connected to the shaft for absorbing vibration of the operating parts of the machine.

11. In a machine of the class described, a shaft, a plurality of pairs of radially adjustable arms connected to said shaft, a receptacle pivotally suspended between each pair of arms, means for delivering material to be weighed to said receptacles, and means for tilting said receptacles to discharge the contents thereof.

12. In a machine of the class described, a shaft, a plurality of pairs of radially adjustable arms connected to said shaft, a receptacle pivotally suspended between each pair of arms, means for delivering material to be weighed to said receptacles, means for tilting said receptacles to discharge the contents thereof, and means connected to said shaft and including movable weights for counter-balancing the weight of the material delivered to and carried by said receptacles.

13. In a machine of the class described, a shaft, a plurality of pairs of radially adjustable arms connected to said shaft, a receptacle pivotally suspended between each pair of arms, means for delivering material to be weighted to said receptacles, means for tilting said receptacles to discharge the contents thereof, means connected to said shaft and including movable weights for counter-balancing the weight of the material delivered to and carried by said receptacles, and means for registering the actions of the movable weights.

14. In a machine of the class described, a shaft, a series of arms carried thereby, a receptacle pivotally suspended from each arm and adapted to receive material to be weighed, a second series of arms carried by the shaft, and movable weights which are adapted to be engaged by the arms of the second series and carried for a part of a complete rotation of the shaft, which weights are adapted to counter-balance the weight of the material delivered to and carried by the receptacles.

15. In a machine of the class described, a shaft, a series of arms carried thereby, a receptacle suspended from each arm and adapted to receive material to be weighed, a second series of arms carried by the shaft, movable weights which are adapted to be engaged by the arms of the second series, which weights are adapted to counter-balance the weight of the material delivered to and carried by the receptacles, and means for automatically discharging the weights from the arms carrying the same, and means for returning the weights into position to be reëngaged by said arms.

16. In a machine of the class described, a shaft, a series of arms carried thereby, a receptacle suspended from each arm and adapted to receive material to be weighed, a second series of arms carried by the shaft, movable weights which are adapted to be engaged by the arms of the second series, which weights are adapted to counter-balance the weight of the material delivered to and carried by the receptacles, means for automatically discharging the weights from the arms carrying the same, means for returning the weights into position to be reengaged by said arms, and means for registering the movements of said weights.

17. In a weighing machine, a rotatably mounted support, a series of receptacles suspended from said support, which receptacles are adapted to receive the material to be weighed, a series of weights adapted to travel for a portion of a complete revolution of the rotatably mounted support to counterbalance the weight of the material delivered to said receptacles, and electrically actuated means for recording the movement of said weights.

18. In a weighing machine, a rotatably mounted support, a series of receptacles suspended from said support, which receptacles are adapted to receive the material to be weighed, a series of weights adapted to counter-balance the weight of the material delivered to said receptacles, a counter located at a point remote from the weighing machine, an electric circuit between the machine and the counter, which circuit includes a source of electrical energy, and a switch loated in said circuit, which switch is adapted to be closed by the movements of the weights within the machine and the closing of which switch actuates the counting device.

In testimony whereof I hereunto affix my signature in the presence of two witnesses, this 1st day of August, 1916.

HENRY C. SCHAPER.

Witnesses:
M. P. SMITH,
M. A. HANDEL.

Copies of this patent may be obtained for five cents each, by addressing the "Commissioner of Patents, Washington, D. C."